Sept. 28, 1948.  J. J. HOWARD ET AL  2,450,343
TREATING OXIDE ORES
Filed Feb. 1, 1947
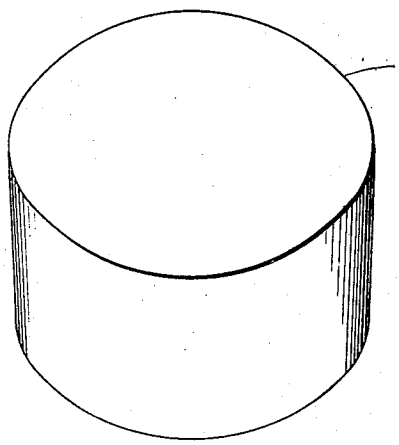
FIG. I.
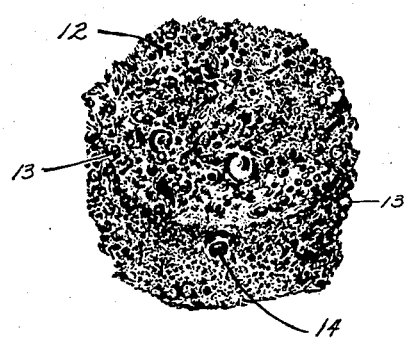
FIG. 2.
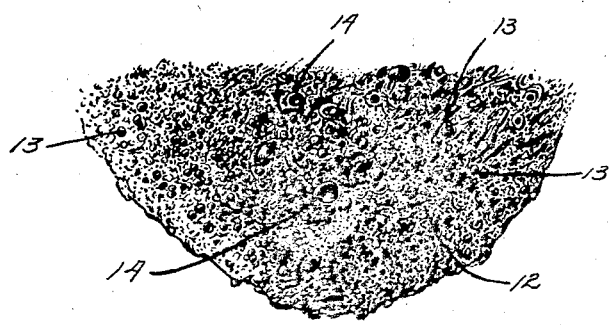
FIG. 3.
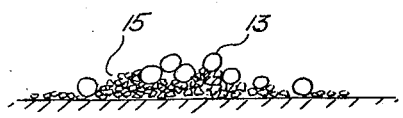
FIG. 4.
INVENTORS
JOHN J. HOWARD
HAROLD A. HEILIGMAN
BY Arthur Middleton
ATTORNEY Patented Sept. 28, 1948

2,450,343

UNITED STATES PATENT OFFICE 2,450,343

TREATING OXIDE ORES

John J. Howard, Philadelphia, and Harold A. Heiligman, Norristown, Pa., assignors to E. J. Lavino and Company, Philadelphia, Pa., a corporation of Delaware Application February 1, 1947, Serial No. 725,834

3 Claims. (Cl. 23—110)

This invention relates generally to the recovery of metal from certain ores, and has particular reference to the treatment of ores which contain substantially only reducible oxides and silica, of which taconite iron ore is one example.

The invention contemplates the treatment of amenable ores in such a fashion as to produce globules of metal in a self-disintegrating matrix, thus facilitating recovery of the metal. The invention further contemplates, simultaneously with the production of the metal, the production of a matrix compound suitable for use as a refractory raw material. To the attainment of these ends, the invention contemplates the heating of the ore under controlled conditions, in admixture with critical amounts of carbonaceous material and calcium oxide yielding material, as described herein.

One object of the invention is to bring about the required reactions in an efficient manner. Another object is to reduce the metal oxides of the ore to yield metal in the form of shot or globules dispersed or suspended in a matrix. A further object of the invention is to yield the metal globules in a reaction product matrix, which upon cooling, disintegrates into a sandy mass of discrete particles or grains. Still another object of the invention is to obtain a reaction product matrix which can be used as a raw material for the manufacture of refractory products.

The invention may be practiced by mixing finely subdivided ore and finely subdivided additions including a carbonaceous reducing reagent such as charcoal, coke, sawdust, and the like and a calcium oxide yielding compound. The finely divided reactants are firmly compressed together and held so, whereby they are in close and intimate contact for facilitating reaction between the reactants when the reaction temperature is reached. To this end, the reactants are preferably moistened with a suitable binder and pressed into shapes such as bricks or briquettes. The binder may be starch, molasses and the like, and should preferably be free of sulphur, phosphorus and other metal contaminating substances. The purpose of the binder is to provide strength for the tightly compressed shapes, permitting the necessary handling and maintaining the shaped body intact during the early stages of the treatment. These shapes are dried and then subjected to reaction temperature in a suitable chamber, such as a crucible or a kiln, whereupon the oxide is reduced to metal which is yielded in a coalesced form of shot or globules or agglomerates dispersed in the reaction product matrix yielded by the reaction between the gangue constituents of the ore and the additions. The treated material is then cooled, whereupon the matrix is found to disintegrate, leaving the agglomerates of metal easily recoverable from the fine grains or sands of the disintegrated matrix. If iron ore be so treated, iron is recovered that is much more equivalent to pig-iron than to sponge iron, for the sponge iron stage is passed in going to the metal-melting temperature. If one feature of this invention is practiced, namely, the careful proportioning of the constituents that go to make up the matrix, the discrete particles of the disintegrated matrix can be used as a starting material for the making of refractories or refractories shapes, for as will be explained, the matrix will be substantially all dicalcium silicate which has a melting point of 3866° F.

The invention is applicable to taconite because iron oxides ($Fe_2O_3$ and $Fe_3O_4$) are readily reducible with carbon. The reduction can be carried out in a self-disintegrating matrix if the proper amount of a CaO yielding compound is added to the mix, because alpha calcium orthosilicate or alpha dicalcium silicate ($2CaO.SiO_2$) is formed at the reaction temperature. There are three crystalline forms of calcium orthosilicate. Alpha calcium orthosilicate is stable at temperatures from 2588° F. to its melting point of 3866° F., beta calcium orthosilicate is stable from 1247° F. to 2588° F., and gamma calcium orthosilicate is stable below 1247° F.

One method of practicing the invention is detailed in the description which follows: It is desired to treat a taconite iron ore which analyzes about 45% $Fe_2O_3$ (equivalent to 31.5% when calculated to metallic Fe) and about 50% $SiO_2$, to recover the iron reducible from the oxides of the ore from a self-disintegrating matrix which can be used as a refractory raw material. Theoretically one pound of $Fe_2O_3$ requires 0.225 pound of carbon for reduction to metallic iron, and the $Fe_2O_3$ in 100 pounds of the taconite being considered will require 45 times 0.225 pound or 10.125 pounds of carbon to yield 31.5 pounds of pure metallic iron. However, the molten iron will dissolve or combine with up to 4% of its weight of carbon, hence an additional 4% of 31.5 pounds or 1.26 pounds of carbon are theoretically required, making the total carbon requirement 11.385 pounds for 100 pounds of the taconite being treated. If the source of carbon is coke containing 90% fixed carbon, then 11.385 pounds divided by .90 or 12.650 pounds of coke are required. It is advantageous to use an excess of carbonaceous material to assure complete recovery of the metal, and in this case at least 15 pounds, and preferably 20 pounds, of coke to 100 pounds of the taconite, are used.

It is preferred to recover the reduced metal from a matrix composed largely of calcium orthosilicate, because at or somewhat above the temperature at which iron oxides are reduced by carbon, alpha calcium orthosilicate is formed and is stable, but while cooling the metal-containing mass to a temperature below 1247° F., the alpha calcium orthosilicate inverts first to the beta and then to the gamma forms. The inversion from beta to gamma is accompanied by a 10% increase in volume, resulting in the phenomenon known as dusting. In other words, the matrix which is hard and rigid above the inversion temperature rapidly disintegrates to a fine powder when the temperature of the mass is dropped to atmospheric, whereupon the metallic globules are readily removed by screening and/or magnetic separation. Of course the mass must be free from stabilizing material, such as phosphates and borates, which are known to hinder or prevent the orthosilicate inversion. Correction of the silica in the ore with alumina or magnesia will not yield a disintegrating mix. The methods of separation suggested (screening and/or magnetic separation) are merely examples, because other wet and dry methods of separation can be used.

To return to the example, 100 pounds of the taconite will yield 50 pounds of $SiO_2$. To form calcium orthosilicate, 60 pounds of $SiO_2$ require 112 pounds of CaO, a weight relationship of CaO to $SiO_2$ of 1.87 to 1. In practice it has been found that the object of the invention is attained when the weight relationship of CaO to $SiO_2$ falls between 1.5 to 1 and 3 to 1. Since this invention contemplates the probable reclaiming of the calcium orthosilicate as a refractory raw material, it is preferred to work between the 1.5 to 1 and the 1.9 to 1 weight ratios. The minimum CaO requirement then will be 1.5×50 pounds or 75 pounds of CaO, which can be supplied for instance by limestone analyzing 53% CaO, in which case 75 pounds divided by .53 or 141 pounds will be required. For ease in preparing the batches, there should then be used 150 pounds of the limestone.

The starting materials therefore are in the following proportions:

| | Pounds |
|---|---|
| Taconite | 100 |
| Limestone | 150 |
| Coke | 20 |

The starting materials are ground, intimately mixed and briquetted. A satisfactory reaction temperature for briquettes of this mixture is about 2800° F., preferably 2900° F. The time for which this temperature must be maintained will vary with the size of the briquettes being treated, since it must be sufficient not only for the reduction of the metallic oxide by the carbon, which is quite rapid, but also for the formation of the alpha calcium orthosilicate. For example, good results have been obtained with briquettes 9" x 4½" x 2" in size on heating in a crucible at 2900° F. for 60 minutes. With smaller briquettes less time is required. The size of the metallic shot or globules is also controllable to a degree by the time and temperature of the heat treatment. In general, the longer the treatment the larger the shot. In fact the treatment can be carried to the point at which most of the molten metal will drain from the briquette, yielding a metallic product and a nearly iron-free residium.

After the heat treatment, the briquettes can be removed from the treating vessel while still above the inversion temperature. In this condition the product consists of globules or shot of metallic iron in a solid matrix of substantially alpha calcium orthosilicate. On cooling the alpha calcium orthosilicate inverts, eventually to the gamma form after the temperature of the mass has dropped below 1247° F., and the entire mass disintegrates in a very short time, usually within 15 to 60 minutes. If the mass is then passed over a screen, say 20 mesh, most of the iron can be recovered. However, some of the iron shot, being finer than 20 mesh, will pass the screen and can be recovered by magnetic separation. Metal obtained by this procedure analyzed over 95% Fe, and contained less than the eutectic percentage of carbon. If the reaction vessel is a crucible, the mass may be cooled in the vessel, but the rate of temperature drop is slower, and more time will be required for the disintegration.

Since the desired reducing reaction is a surface phenomenon between solids, the ore and the reactants should not only be subjected to fine grinding, such as to be of at least minus 10 mesh and preferably of minus 65 mesh screen size, but they should be compacted or pressed together, since the finer the particles and the closer their contact, the more efficient the chemical reaction.

The compressing of the finely divided reactants into dense shapes has other advantages in that whereas a reducing reaction is required, it can be effected in the heat-treatment chamber even though there is no reducing atmosphere therein. The reason is that the constituents are in such intimate surface contact that when the carbon reaches the incandescent state the iron ore is so close thereto that outside atmosphere cannot influence the reaction between the incandescent carbon and the oxide of the ore so long as there is enough environmental heat since the reaction is endothermic. Thus, if the heat-induced reaction is carried out in a non-reducing or even in an oxidizing atmosphere, there may be some slight absence of reduction of the reactants on that surface of the shapes that may be exposed to the oxidizing atmosphere, but the proportion is so small as to be negligible.

Thus the shapes are subjected in the heat-treatment chamber or furnace to sufficient heat to assure the oxide reduction and the yielding of the reaction-product matrix. After the reducing heat treatment, the shapes are cooled. One of the great obstacles in the sponge-iron process is the difficulty of cooling the mass after reduction without oxidation of the very finely divided iron, but in the present process, the reduced metal is acted on at high enough temperature to form globules or agglomerates and these are not easy to oxidize and thus may be cooled without appreciable reoxidization. The cold shapes containing globules of the reduced metal dispersed therein are rapidly disintegrated into sand-form, from which the metal globules or agglomerates are easily recoverable. Thus this invention lends itself, because of the relatively simple apparatus required, as well as the commonly occurring carbonaceous material used, to being practiced at the place where the ore is found. This product is a cheap substitute for scrap iron used in steel making.

The commercial usefulness of this invention is not necessarily limited to a practice in which both products are utilized. The practice of the invention can be applied to taconite ores for the recovery of the iron only. A great deal of research on methods of making available the iron in such low grade ores to the steel industry is currently under way. To the best of our knowledge, all other methods being considered involve grinding the low grade iron ore to unlock the iron oxide from the associated silica, often grinding to sub-sieve sizes, that is less than 43 microns, which is the opening in a Bureau of Standards 325 mesh screen. After the iron oxide is unlocked, it is recovered by hydrometallurgical processes such as jigging, tabling or flotation. Following its recovery in a very fine state of subdivision, the iron oxide is agglomerated by nodulizing or sintering, yielding a product sufficiently rich in iron oxide and physically suitable for reduction to pig iron in a blast furnace or for other metallurgical purposes requiring so-called high grade iron ore. In contradistinction to this involved and costly procedure, this invention proposes to remove the iron directly from the low grade ore in a few relatively simple and comparatively low cost steps.

However, the usefulness of this invention is not restricted to so-called low grade iron ores. There are many sources, rich in iron oxide, which because of their fine state of subdivision, or their softness, are not considered good feed for the pig iron blast furnaces in their natural condition. High grade ores, analyzing over 90% iron expressed as $Fe_2O_3$ have been treated with similar results. Nor is the practice of the invention limited to the example described. Although it has been pointed out that the invention relates specifically to ores consisting substantially of reducible oxides and silica, it will be at once apparent that an ore with an appreciable lime content which otherwise meets the requirements will fall within the scope of the invention, since the invention contemplates an addition of a CaO yielding compound calculated from the silica content of the ore.

The invention is illustrated in the accompanying drawing in which Fig. 1 is a perspective view of a pressed briquette or shape of the finely divided and intimately mixed starting materials of this invention. Fig. 2 is a perspective view of the briquette of Fig. 1 after heat-treatment to show how it has shrunk in all dimensions—these two figures being drawn to scale to show the proportion of shrinkage. Fig. 3 is an enlarged view of a section of the surface of the heat-treated briquette of Fig. 2. Fig. 4 shows the disintegrated matrix after cooling, with the metal agglomerates lying loosely therein.

In the drawings, the numeral 11 indicates the briquette or shape of ore, lime and carbonaceous starting materials bound and pressed together. 12 indicates the reaction-production matrix in which are dispersed coalesced globules of reduced metal 13. 15 indicates the discrete particles or sandy mass of the disintegrated matrix, yielded upon cooling.

This invention can be practiced by first analyzing the ore to be treated to determine its content of reducible oxides, of silica, and of lime. With this data, the operator then calculates the amount of carbonaceous material and calcium oxide yielding materials required to yield the metal reducible from the oxides in a matrix which is substantially calcium orthosilicate. The proper proportions of the starting materials, which have previously been ground to about minus 10 mesh, and preferably to about minus 65 mesh, are intimately mixed and briquetted. The briquettes are heated in a suitable furnace chamber to a temperature which is high enough and maintained long enough to reduce the metallic oxides to metal, to maintain the metal thus formed in a molten state until it forms shot or globules, and to insure reaction between the silica and lime to yield calcium orthosilicate. The calcium orthosilicate will, upon cooling, disintegrate into a sandy mass of discrete grains from which the metal is readily separable, for example as by screening out the metal agglomerates which in general are larger than the sands; or by magnetic separation. The sandy mass of calcium orthosilicate can be used as a starting material from which to make refractory articles such as bricks or other shapes, and refractory cements.

The invention herein described and exemplified is by no means limited to the examples cited.

We claim:

1. The process of recovering iron from ores consisting essentially of iron oxides and silica, which comprises mixing the ore with sufficient carbonaceous material to effect reduction of the iron oxides and sufficient calcium oxide yielding material to provide a CaO to $SiO_2$ ratio in the starting mixture that lies in a range of from 1.5 parts to 3.0 parts of CaO to 1 part of $SiO_2$ by weight, forming the mixture into compact shapes, subjecting the shapes to a temperature of approximately 2900° F. whereby the iron oxides are reduced to iron and formed into globules in a matrix substantially alpha calcium orthosilicate, cooling the resulting mass to atmospheric temperature to invert the calcium orthosilicate from its alpha form through its beta form and finally to its gamma form whereby during the latter inversion there is such a significant increase in volume that the matrix disintegrates into discrete particles, and recovering the iron.

2. The process according to claim 1, wherein, after disintegration of the matrix, particles of the sandy mass are smaller than the globules of metal.

3. The process of producing a refractory raw material which comprises mixing a starting material consisting essentially of iron oxides and silica with a carbonaceous reducing agent and a calcium oxide yielding material, adjusting the proportion of CaO to $SiO_2$ in the mixture to fall within a range of from 1.5 parts to 3.0 parts of CaO to 1 part of $SiO_2$ by weight, forming the mixture into shapes by pressure, subjecting the shapes to a temperature of substantially 2900° F. to reduce the iron oxides of the ore to iron and to form a calcium orthosilicate matrix, cooling the resulting mass to disintegrate the calcium orthosilicate, and recovering the calcium orthosilicate.

JOHN J. HOWARD.
HAROLD A. HEILIGMAN.

REFERENCES CITED

The following references are of record in the file of this patent:

UNITED STATES PATENTS

| Number | Name | Date |
| --- | --- | --- |
| 1,717,160 | Kichline | June 11, 1929 |
| 1,897,881 | Basset | Feb. 14, 1933 |
| 1,983,604 | Flannery | Dec. 11, 1934 |
| 2,028,105 | Head | Jan. 14, 1936 |
| 2,242,258 | Noll | May 20, 1941 |